United States Patent
Syu

(10) Patent No.: US 9,829,400 B2
(45) Date of Patent: Nov. 28, 2017

(54) MAGNETIC TORQUER SENSOR FOR STEERING SYSTEM

(71) Applicant: ROTATECH INTERNATIONAL CORP., Taichung (TW)

(72) Inventor: Shao-Syuan Syu, Taichung (TW)

(73) Assignee: Rotatech International Corp., Taichung (TW)

( * ) Notice: Subject to any disclaimer, the term of this patent is extended or adjusted under 35 U.S.C. 154(b) by 168 days.

(21) Appl. No.: 15/014,465

(22) Filed: Feb. 3, 2016

(65) Prior Publication Data
US 2017/0219446 A1    Aug. 3, 2017

(51) Int. Cl.
G01L 3/00    (2006.01)
G01L 3/10    (2006.01)

(52) U.S. Cl.
CPC .................................. *G01L 3/104* (2013.01)

(58) Field of Classification Search
CPC . G01L 3/101; G01L 3/104; G01L 3/24; G01L 3/10; G01L 3/08; G01L 3/1457; G01L 1/04; G01L 25/003; G01L 25/00; G01N 29/265; G01R 1/28; G01R 11/36
USPC ...... 73/862.331, 862.325, 862.321, 862.191, 73/862.08, 862.621, 862, 1.08, 1.09
See application file for complete search history.

(56) References Cited

U.S. PATENT DOCUMENTS

| | | | |
|---|---|---|---|
| 2007/0295109 A1* | 12/2007 | Tokumoto | B29C 45/14065 73/862.331 |
| 2009/0107259 A1* | 4/2009 | Ishihara | B62D 6/10 73/862.193 |
| 2013/0152702 A1* | 6/2013 | Takahashi | G01L 3/101 73/862.331 |
| 2013/0221957 A1* | 8/2013 | Ludwig | G01L 3/104 324/207.25 |

\* cited by examiner

*Primary Examiner* — Lisa Caputo
*Assistant Examiner* — Nigel Plumb
(74) *Attorney, Agent, or Firm* — Muncy, Geissler, Olds & Lowe, P.C.

(57) ABSTRACT

A magnetic torquer sensor for a steering system includes a magnetic unit, a magnetism-collecting unit, and a magnetic sensing element. The magnetic unit has a magnet ring. The magnetism-collecting unit has an inner magnetism-collecting ring and an outer magnetism-collecting ring. The inner magnetism-collecting ring has inner magnetism-collecting portions. The outer magnetism-collecting ring has outer magnetism-collecting portions. The outer magnetism-collecting portions and the inner magnetism-collecting portions are arranged alternately. The inner magnetism-collecting portions have their inner surfaces spaced from the magnet ring by a predetermined interval and level with inner surfaces of the outer magnetism-collecting portions. The magnetic sensing element is arranged at outer surfaces of the inner and outer magnetism-collecting rings for sensing magnetic-field variation between the inner and outer magnetism-collecting rings when they rotate with respect to the magnet ring. Thereby, the steering system provides good linearity.

9 Claims, 6 Drawing Sheets

MAGNETIC TORQUER SENSOR FOR STEERING SYSTEM

BACKGROUND OF THE INVENTION

1. Technical Field

The present invention relates to torque sensors, and more particularly to a magnetic torquer sensor that is designed for a steering system and provides good linearity.

2. Description of Related Art

As to a sensor, its static characteristics can be obtained using the relationship between its input and output. The key indicators for static characteristics include linearity, hysteresis, repeatability, sensitivity, accuracy and reproducibility. The dynamic characteristics of a sensor refer to the sensor's responsive characteristics generated by its input and influenced by time, and are usually described using models for automatic control, such as the transfer function.

Among the static characteristics, linearity represents discrepancy between an actual measured curve and an ideal curve of a sensor. The smaller the discrepancy is, the better the linearity of the sensor is. In view of this, the inventor of the present invention herein proposes a magnetic torque-sensing device that is designed for a steering system and performs desirably in terms of linearity.

SUMMARY OF THE INVENTION

The primary objective of the present invention is to provide a magnetic torquer sensor that is designed for a steering system and performs desirably in terms of linearity.

For achieving the foregoing objective, the disclosed magnetic torquer sensor comprises a housing, a magnetic unit, a magnetism-collecting unit, and a magnetic sensing element. The magnetic unit has a fixed bracket fixed in the housing and a magnet ring received in the fixed bracket. The magnetism-collecting unit has a moving bracket rotatably received in the housing, an inner magnetism-collecting ring fixed to the moving bracket, and an outer magnetism-collecting ring fixed to the moving bracket, so that the inner and outer magnetism-collecting rings rotate with the moving bracket. The inner magnetism-collecting ring has a plurality of spaced inner magnetism-collecting portions. The outer magnetism-collecting ring has a plurality of spaced outer magnetism-collecting portions. The inner magnetism-collecting portions of the inner magnetism-collecting ring and the outer magnetism-collecting portions of the outer magnetism-collecting ring are arranged alternately. The inner magnetism-collecting portions of the inner magnetism-collecting ring each have a first plane facing the magnet ring and a second plane back on to the magnet ring. The outer magnetism-collecting portions of the outer magnetism-collecting ring each have a third plane facing the magnet ring and a fourth plane back on to the magnet ring. The first plane of the inner magnetism-collecting portion of the inner magnetism-collecting ring and the magnet ring are spaced by a predetermined interval. The first planes of the inner magnetism-collecting portions of the inner magnetism-collecting ring are level with the third planes of the outer magnetism-collecting portions of the outer magnetism-collecting ring. The magnetic sensing unit has a mount provided on the housing and a magnetic sensing element installed in the mount. The magnetic sensing element is positionally aligned with the second plane of one of the inner magnetism-collecting portions of the inner magnetism-collecting ring and the fourth plane of one of the outer magnetism-collecting portions of the outer magnetism-collecting ring in an alternate manner for sensing magnetic-field variation generated by the inner and outer magnetism-collecting rings as they rotate with the magnet ring. Thereby, the disclosed magnetic torque-sensing device performs desirably in terms of linearity.

The following preferred embodiments when read with the accompanying drawings are made to clearly exhibit the above-mentioned and other technical contents, features and effects of the disclosed magnetic torque-sensing device. Through the exposition by means of the specific embodiments, people would further understand the technical means and effects the present invention adopts to achieve the above-indicated objectives. However, the accompanying drawings are intended for reference and illustration, but not to limit the present invention.

DETAILED DESCRIPTION OF THE INVENTION

Figure 1:
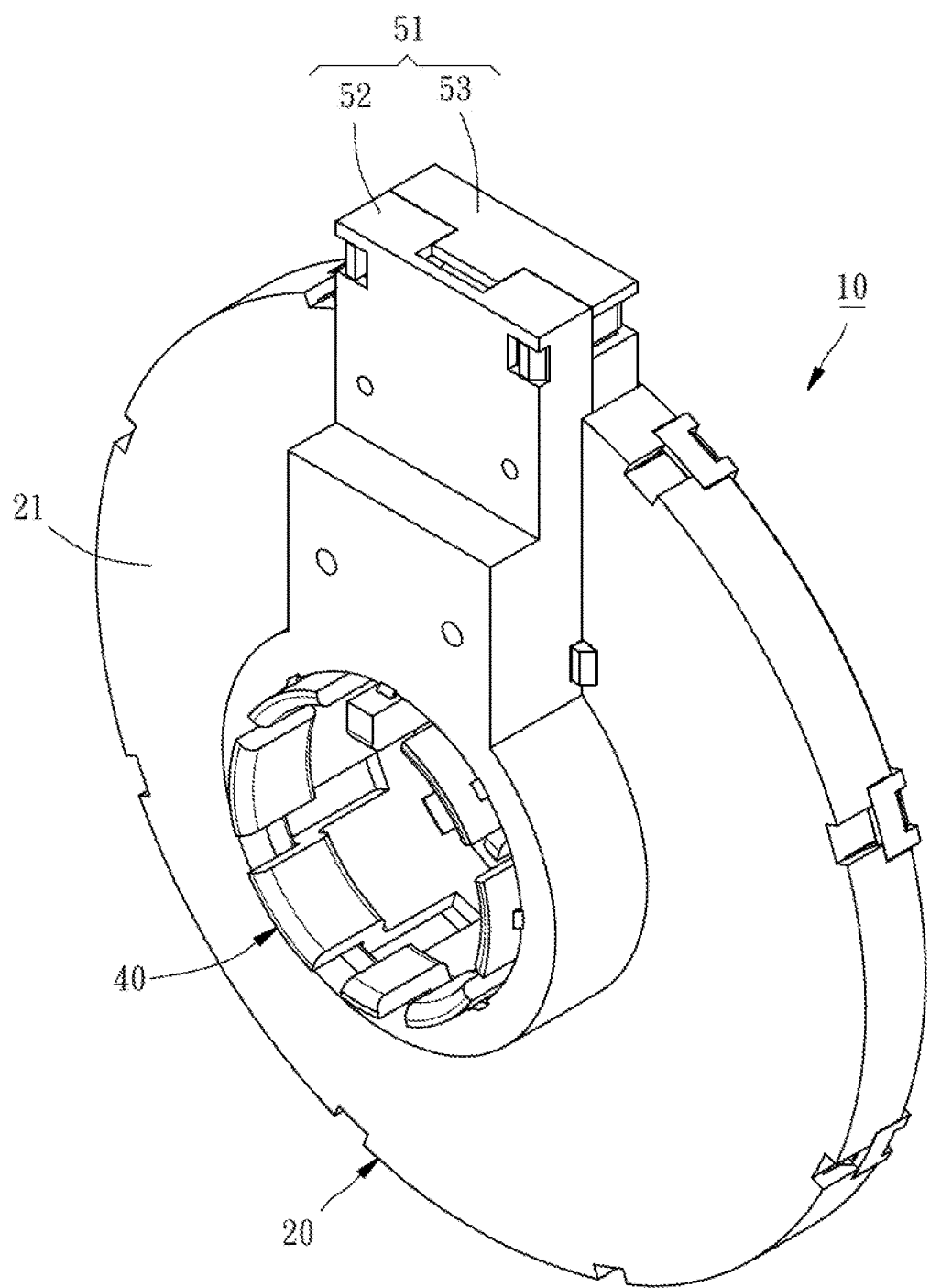
FIG. 1 is a perspective view of the present invention.
Figure 2:
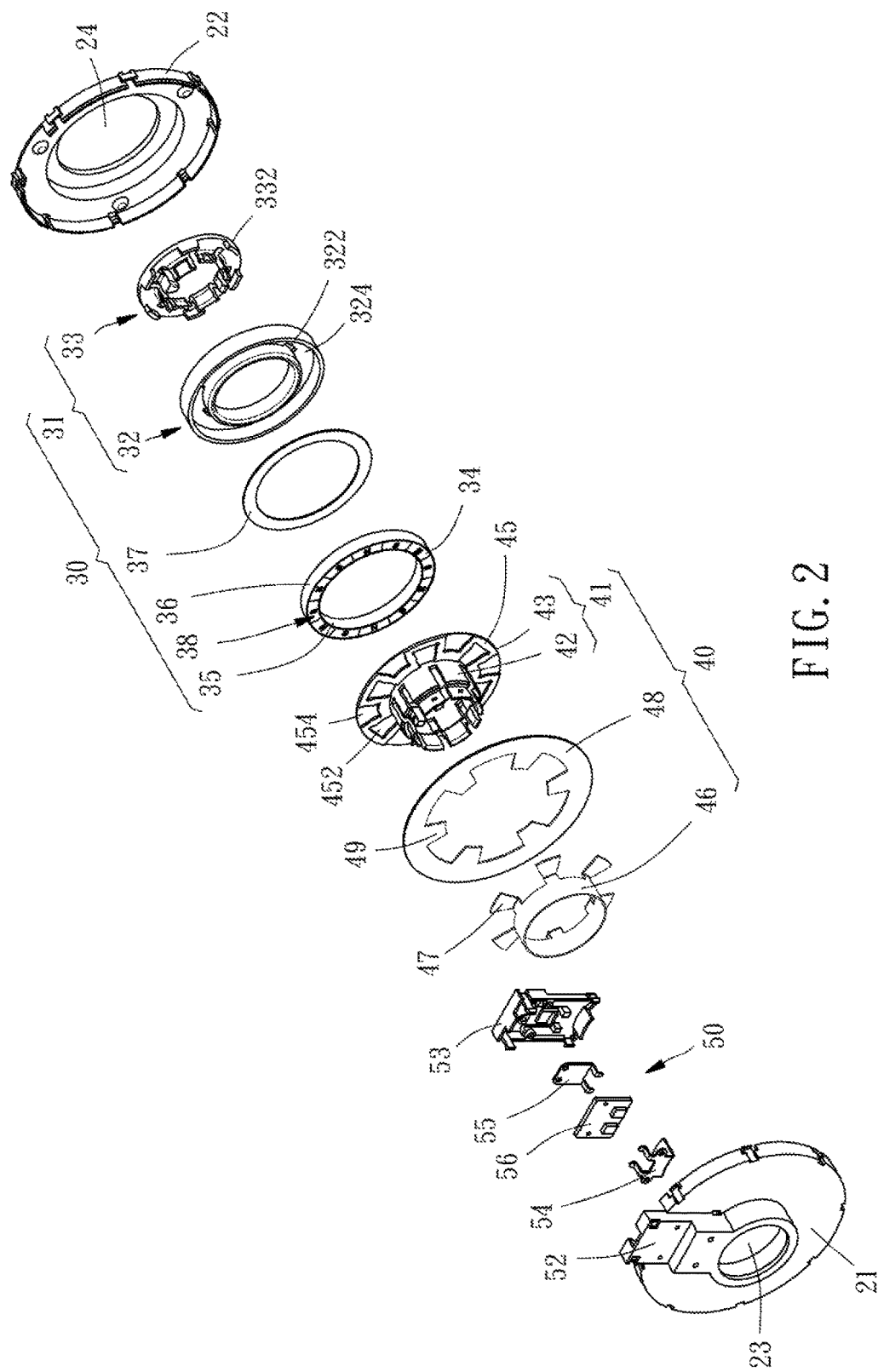
FIG. 2 is an exploded view of the present invention.

Referring to FIGS. 1 and 2, in one embodiment of the present invention, a magnetic torquer sensor 10 that is designed for a steering system comprises a housing 20, a magnetic unit 30, a magnetism-collecting unit 40, and a magnetic sensing unit 50.

Figure 3:
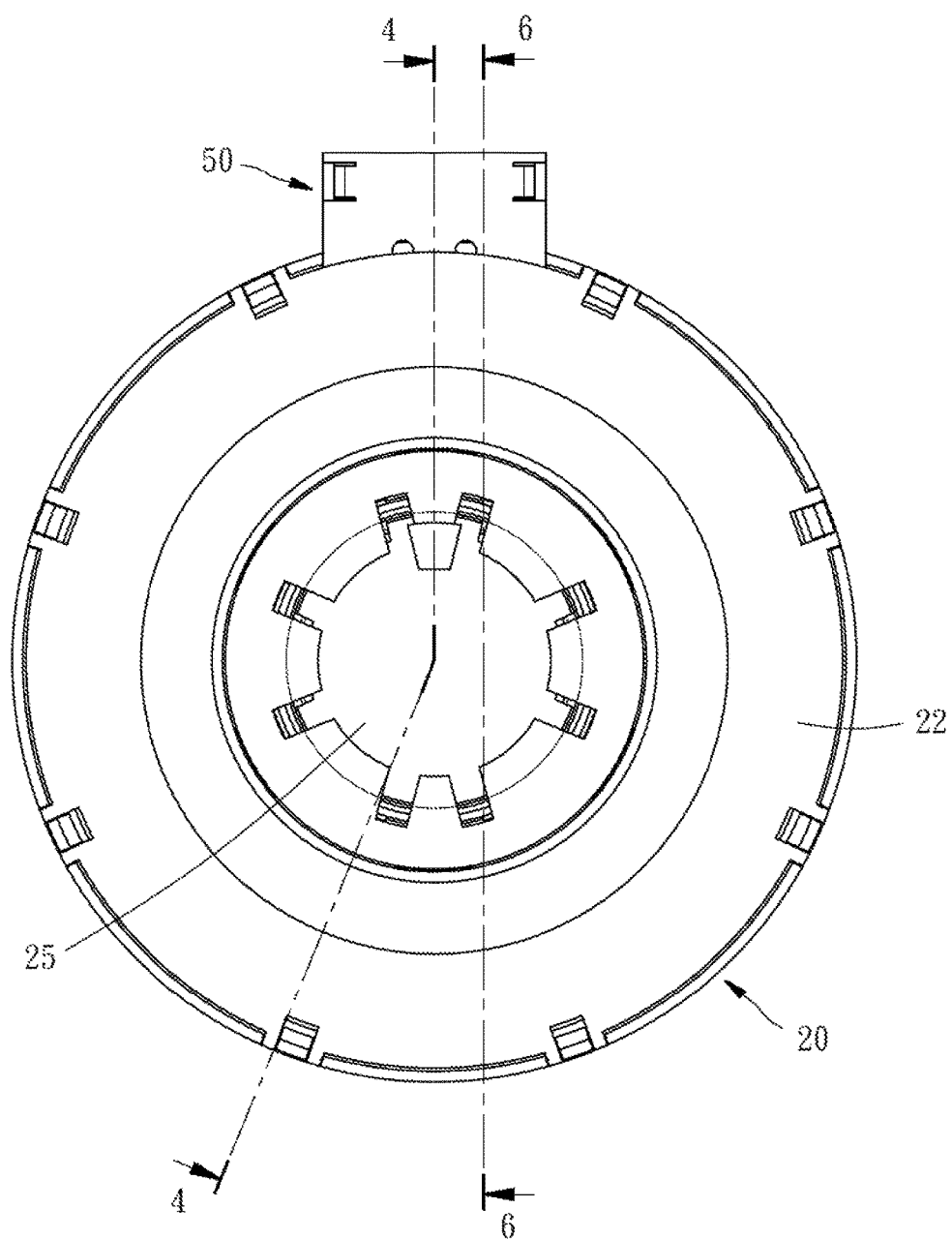
FIG. 3 is a plane view of the present invention.

The housing 20 has a first housing half 21 and a second housing half 22 that combined with the first housing half 21. The first housing half 21 has a first central hole 23, and the second housing half 22 has a second central hole 24. The first and second central holes 23, 24 are mutually communicated to form an axial hole 25 (as shown in FIG. 3).

The magnetic unit 30 has a fixed bracket 31. The fixed bracket 31 has a first annular fixing seat 32 and a second annular fixing seat 33. The first annular fixing seat 32 has its surface facing the second housing half 22 provided with a plurality of spaced engaging grooves 322. The first annular fixing seat 32 has its surface back on to second housing half 22 formed with an annular groove 324. The second annular fixing seat 33 is received in the second central hole 24 of the second housing half 22, and the second annular fixing seat 33 is peripherally provided with a plurality of engaging tongues 332. The second annular fixing seat 33 has the engaging tongues 332 fittingly engaged with the engaging grooves 322 of the first annular fixing seat 32, so that the first and second annular fixing seats 32, 33 are combined together. In addition, the magnetic unit 30 further has a magnet ring 38. In the present embodiment, the magnet ring 38 is formed by connecting a plurality of permanent magnets 34, wherein each two adjacent permanent magnets 34 attract each other. The magnet ring 38 is retained between an inner retaining ring 35 and an outer retaining ring 36, and is installed in the annular groove 324 of the first annular fixing seat 32 along with the inner and outer retaining rings 35, 36 and a gasket 37. It is to be noted that the magnet ring 38 may be a single magnetized magnetic structure instead of the combination of permanent magnets 34, and the same effect can be also achieved.

Figure 4:
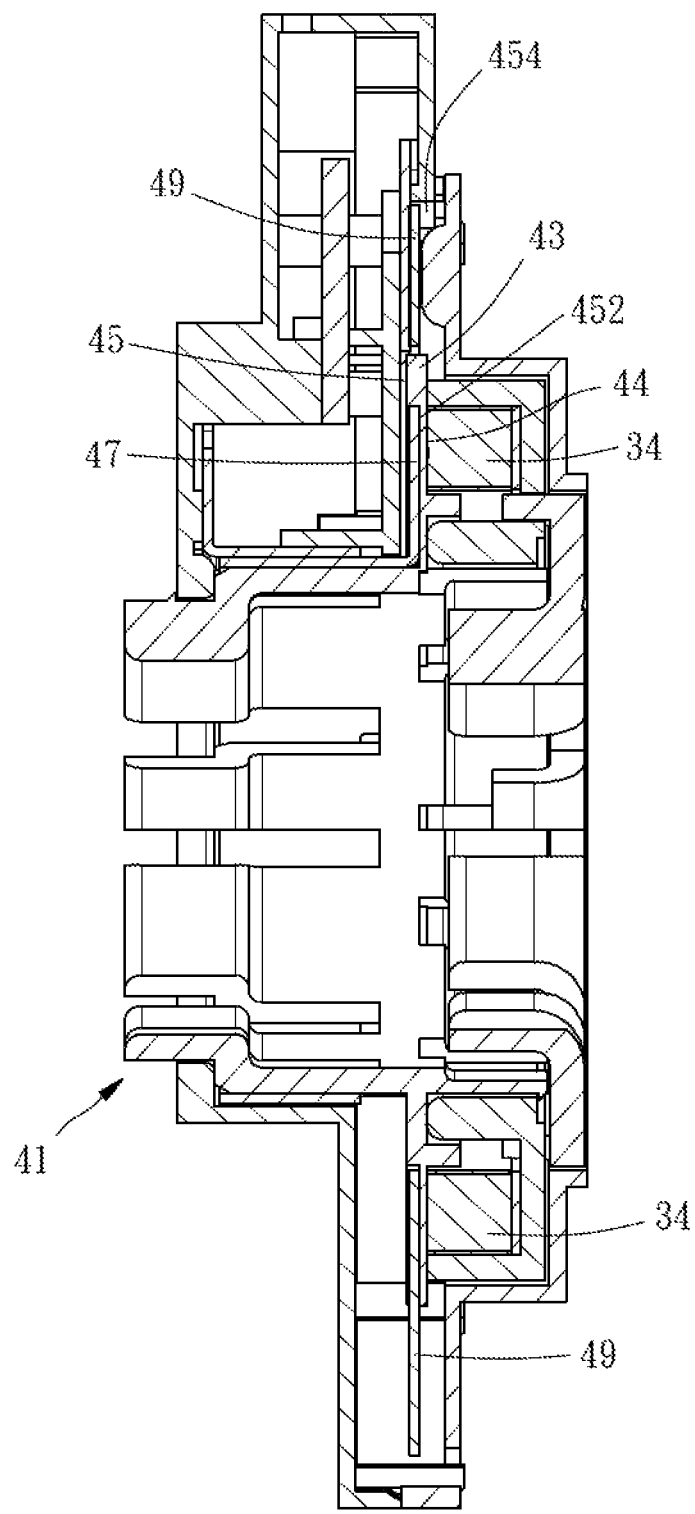
FIG. 4 is a cross-sectional view of the present invention taken along Line 4-4 of FIG. 3.

The magnetism-collecting unit 40 has a moving bracket 41. The moving bracket 41 has a shaft portion 42 and a ring portion 43. The shaft portion 42 of the moving bracket 41 is rotatably received in the first central hole 23 of the first housing half 21 and is coaxially aligned with the axial hole 25 of the housing 20 for a shaft (not shown) to pass therethrough. The ring portion 43 of the moving bracket 41 is connected to the periphery of the shaft portion 42 of the moving bracket 41 and has a first bearing surface 44 and a second bearing surface 45 back on to the first bearing surface 44. As shown in FIG. 2 and FIG. 4, the first bearing surface 44 of the ring portion 43 of the moving bracket 41 abuts against the magnet ring 38. The second bearing surface 45 of the ring portion 43 of the moving bracket 41 has a plurality of spaced inner positioning recesses 452 and a plurality of spaced outer positioning recesses 454. The inner and outer positioning recesses 452, 454 are arranged alternately and open to opposite directions.

Figure 5:
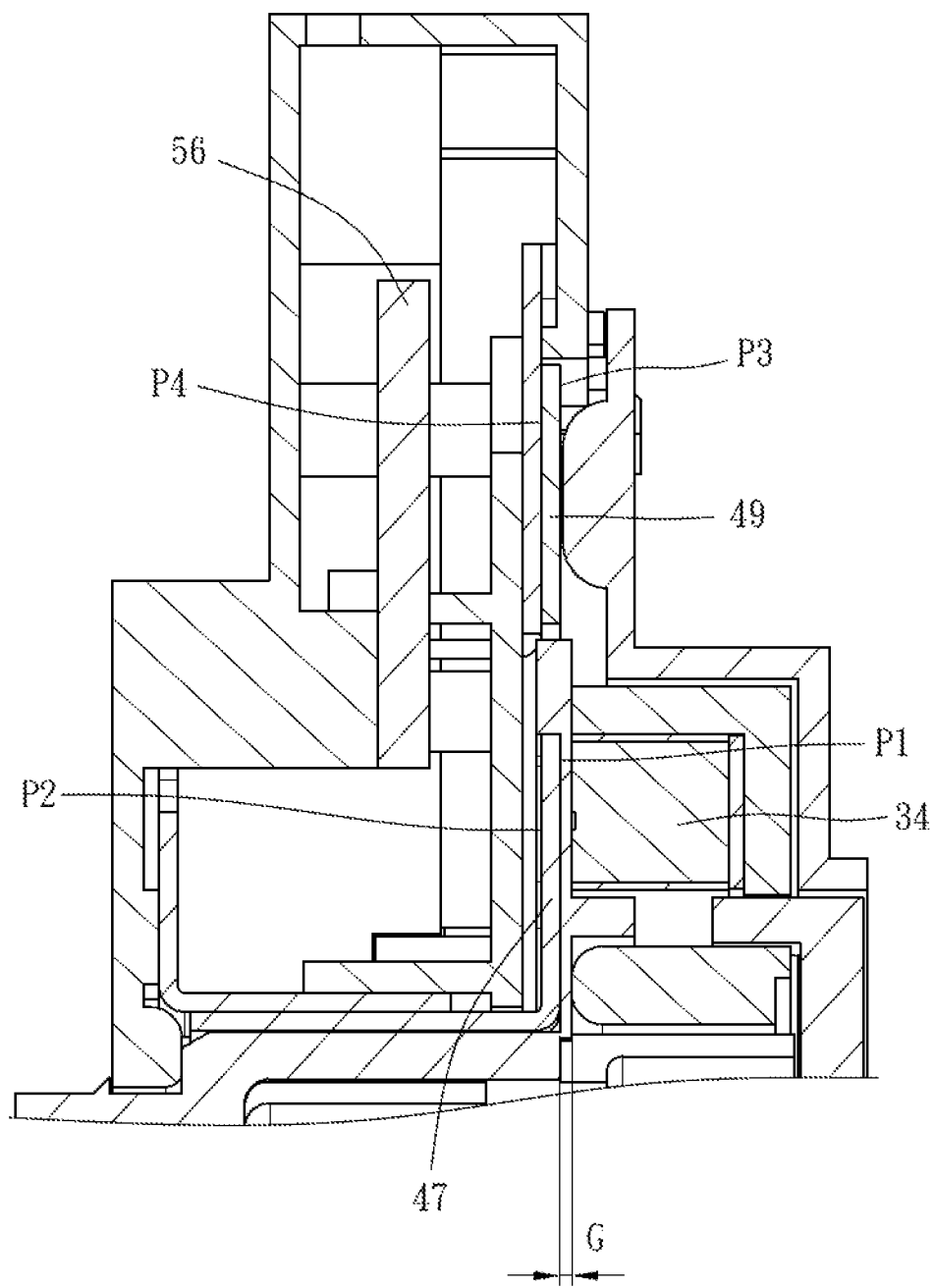
FIG. 5 is a partial, enlarged view of FIG. 4.

Additionally, as shown in FIGS. 2, 4 and 5, the magnetism-collecting unit 40 further has an inner magnetism-collecting ring 46 and an outer magnetism-collecting ring 48. The inner magnetism-collecting ring 46 is mounted around the shaft portion 42 of the moving bracket 41 and has a plurality of spaced inner magnetism-collecting portions 47. The inner magnetism-collecting portions 47 are inlaid into the inner positioning recesses 452 of the moving bracket 41. The outer magnetism-collecting ring 48 is mounted around the inner magnetism-collecting ring 46 and has a plurality of spaced outer magnetism-collecting portions 49. The outer magnetism-collecting portions 49 are inlaid into the outer positioning recesses 454 of the moving bracket 41. Thereby, the inner magnetism-collecting portions 47 of the inner magnetism-collecting ring 46 and the outer magnetism-collecting portions 49 of the outer magnetism-collecting ring 48 are arranged alternately, so that the inner and outer magnetism-collecting rings 48, 49 generate magnetic-field variation as they rotate with the moving bracket 41.

As shown in FIG. 5, the inner magnetism-collecting portions 47 of the inner magnetism-collecting ring 46 each have a first plane P1 facing the magnet ring 38 and a second plane P2 back on to the magnet ring 38. The first plane P1 of the inner magnetism-collecting portion 47 of the inner magnetism-collecting ring 46 and the magnet ring 38 are spaced by a predetermined interval G. The predetermined interval G is between 0.2 mm and 0.8 mm, and preferably between 0.2 and 0.6mm, as proven by the test results shown in the table below.

| | Predetermined Interval (mm) | | | | | | |
|---|---|---|---|---|---|---|---|
| | 0.2 | 0.3 | 0.4 | 0.5 | 0.6 | 0.7 | 0.8 |
| Linearity (%) | 0.442 | 0.547 | 0.667 | 0.848 | 0.994 | 1.15 | 1.31 |

In addition, as shown in FIG. 5, the outer magnetism-collecting portions 49 of the outer magnetism-collecting ring 48 each have a third plane P3 facing the magnet ring 38 and a fourth plane P4 back on to the magnet ring 38. The third planes P3 of the outer magnetism-collecting portions 49 of the outer magnetism-collecting ring 48 are level with the first planes P1 of the inner magnetism-collecting portions 47 of the inner magnetism-collecting ring 46. The fourth planes P4 of the outer magnetism-collecting portions 49 of the outer magnetism-collecting ring 48 are level with the second planes P2 of the inner magnetism-collecting portions 47 of the inner magnetism-collecting ring 46.

Figure 6:
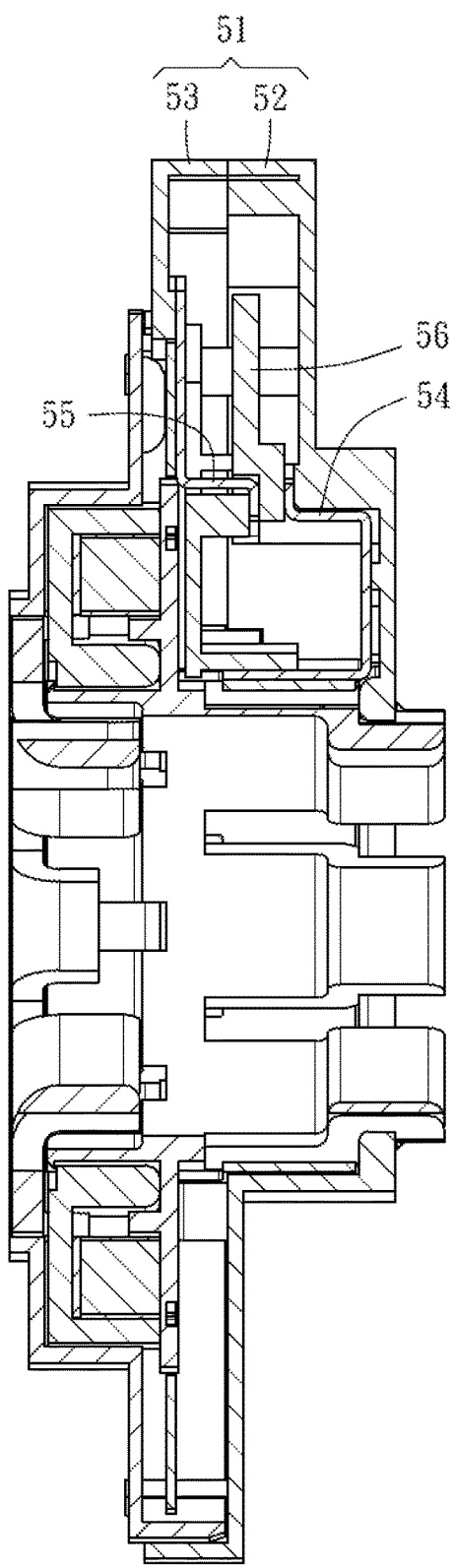
FIG. 6 is a cross-sectional view of the present invention taken along Line 6-6 of FIG. 3.

Referring to FIGS. 2, 5 and 6, the magnetic sensing unit 50 has a mount 51, a first support 54, a second support 55, and a magnetic sensing element 56. The mount 51 has a first cover 52 and a second cover 53. The first cover 52 is fixed to the first housing half 21 of the housing 20, and the second cover 53 is combined with the first cover 52. The first support 54 is fixed to the surface of the first cover 52 facing the second cover 53, and the second support 55 is fixed to the surface of the second cover 53 facing the first cover 52. The magnetic sensing element 56 (being a Hall sensor in the depicted example) is installed between the first and second covers 52, 53 of the mount 51 and is sandwiched and thereby positioned by the first and second supports 54, 55, so that the magnetic sensing element 56 is positionally aligned with the second plane P2 of one of the inner magnetism-collecting portions 47 of the inner magnetism-collecting ring 46 and the fourth plane P4 of one of the outer magnetism-collecting portions 49 of the outer magnetism-collecting ring 48 in an alternate manner, thereby sensing magnetic-field variation generated by the inner and outer magnetism-collecting rings 46, 48 when they rotate with respect to the magnet ring 38.

With the foregoing configuration, the disclosed magnetic torque-sensing device 10 can make the inner and outer magnetism-collecting ring 46, 48 and magnet ring 38 reliably keep the interval therebetween without the need of using additional fixing elements. Consequently, the magnetic torque-sensing device 10 of the present invention when used in a steering system can perform desirably in terms of linearity with the fixed interval, thereby achieving the objective of the present invention.

What is claimed is:

1. A steering system for a magnetic torquer sensor, the steering system comprising:
   a housing;
   a magnetic unit, having a fixed bracket installed in the housing and a magnet ring received in the fixed bracket;
   a magnetism-collecting unit, having a moving bracket rotatably received in the housing, an inner magnetism-collecting ring installed in the moving bracket, and an outer magnetism-collecting ring installed in the moving bracket, wherein the inner magnetism-collecting ring has a plurality of spaced inner magnetism-collecting portions, and the outer magnetism-collecting ring has a plurality of spaced outer magnetism-collecting portions, the inner magnetism-collecting portions of the inner magnetism-collecting ring and the outer magnetism-collecting portions of the outer magnetism-collecting ring being arranged alternately, each of the inner magnetism-collecting portions of the inner magnetism-collecting ring having a first plane facing the magnet ring and a second plane back on to the magnet ring, each of the outer magnetism-collecting portions of the outer magnetism-collecting ring having a third plane facing the magnet ring and a fourth plane back on to the magnet ring, the first planes of the inner magnetism-collecting portions of the inner magnetism-collecting ring being spaced from the magnet ring by a predetermined interval, the first planes of the inner magnetism-collecting portions of the inner magnetism-collecting ring being level with the third planes of the outer magnetism-collecting portions of the outer magnetism-collecting ring; and
   a magnetic sensing unit, having a mount and a magnetic sensing element, wherein the mount is provided on the housing, and the magnetic sensing element is received in the mount and positionally aligned with the second plane of one said inner magnetism-collecting portion of the inner magnetism-collecting ring and the fourth plane of one said outer magnetism-collecting portion of the outer magnetism-collecting ring in an alternate manner, for sensing magnetic-field variation generated by the inner and outer magnetism-collecting rings when the inner and outer magnetism-collecting rings rotate with the magnet ring.

2. The magnetic torquer sensor of claim 1, wherein the predetermined interval is between 0.2 mm and 0.8 mm.

3. The magnetic torquer sensor of claim 2, wherein the predetermined interval is between 0.2 mm and 0.6 mm.

4. The magnetic torquer sensor of claim 1, wherein the second planes of the inner magnetism-collecting portions of the inner magnetism-collecting ring are level with the fourth planes of the outer magnetism-collecting portions of the outer magnetism-collecting ring.

5. The magnetic torquer sensor of claim 1, wherein the moving bracket has a shaft portion and a ring portion, in which the shaft portion is coaxially aligned with an axial hole of the housing, and the ring portion is connected to a periphery of the shaft portion and has a first bearing surface and a second bearing surface back on to the first bearing surface, so that the first bearing surface of the ring portion abuts against the magnet ring, the second bearing surface of the ring portion having a plurality of spaced inner positioning recesses and a plurality of spaced outer positioning recesses, the inner positioning recesses and the outer positioning recesses being arranged alternately and open to opposite directions, the inner magnetism-collecting portions of the inner magnetism-collecting ring being received in the inner positioning recesses, and the outer magnetism-collecting portions of the outer magnetism-collecting ring being received in the outer positioning recess.

6. The magnetic torquer sensor of claim 1, wherein the fixed bracket has a first annular fixing seat and a second annular fixing seat, in which the first annular fixing seat has at least one engaging groove and an annular groove while the second annular fixing seat has at least one engaging tongue, so that the engaging tongue is fittingly engaged with the engaging groove of the first annular fixing seat, and the magnet ring is received in the annular groove of the first annular fixing seat.

7. The magnetic torquer sensor of claim 1, wherein the mount has a first cover, a second cover combined with the first cover, a first support provided on the first cover, and a second support provided on the second cover, so that the magnetic sensing element is located between the first and second covers of the mount and is positioned between the first and second supports.

8. The magnetic torquer sensor of claim 1, wherein the magnet ring is made by connecting a plurality of permanent magnets in which each two adjacent said magnet attract each other.

9. The magnetic torquer sensor of claim 1, wherein the magnet ring is a single magnetized magnetic structure.

* * * * *